United States Patent
Shida et al.

(10) Patent No.: US 9,936,152 B2
(45) Date of Patent: Apr. 3, 2018

(54) IMAGE SENSOR AND SENSOR MODULE (71) Applicant: Renesas Electronics Corporation, Koutou-ku, Tokyo (JP)

(72) Inventors: Koji Shida, Tokyo (JP); Hideki Wakisaka, Tokyo (JP); Katsumi Dosaka, Tokyo (JP)

(73) Assignee: Renesas Electronics Corporation, Tokyo ( * ) Notice: Subject to any disclaimer, the term of this patent is extended or adjusted under 35 U.S.C. 154(b) by 11 days.

(21) Appl. No.: 15/145,752

(22) Filed: May 3, 2016

(65) Prior Publication Data
US 2017/0026594 A1  Jan. 26, 2017

(30) Foreign Application Priority Data

Jul. 22, 2015  (JP) .................................. 2015-144781

(51) Int. Cl.
*H04N 5/355* (2011.01)
*H04N 5/235* (2006.01)

(52) U.S. Cl.
CPC ....... *H04N 5/35581* (2013.01); *H04N 5/2355* (2013.01)

(58) Field of Classification Search
CPC .......................... H04N 5/35581; H04N 5/2355
See application file for complete search history.

(56) References Cited

U.S. PATENT DOCUMENTS

| 7,791,775 B2 | 9/2010 | Haneda |  |
|---|---|---|---|
| 2011/0285737 A1 | 11/2011 | Lin |  |
| 2013/0208138 A1* | 8/2013 | Li | H04N 5/2353 348/229.1 |
| 2013/0271623 A1* | 10/2013 | Jo | H04N 5/2357 348/226.1 |

FOREIGN PATENT DOCUMENTS

JP       2006-311240 A      11/2006

* cited by examiner

*Primary Examiner* — Christopher K Peterson
(74) *Attorney, Agent, or Firm* — Shapiro, Gabor and Rosenberger, PLLC (57) ABSTRACT

According to one aspect of the present invention, an image sensor and a sensor module have a configuration in which the image sensor outputs first brightness information representing brightness information of first image information obtained with a first exposure time and second brightness information representing brightness information of second image information obtained with a second exposure time separately from a composite image obtained by synthesizing the first image information and the second image information, updates the first and second exposure times based on an exposure time set value externally generated based on the first brightness information and the second brightness information, and changes a synthesis set value used for synthesis of the composite image based on the exposure time set value externally generated based on the first brightness information and the second brightness information.

8 Claims, 8 Drawing Sheets

IMAGE SENSOR AND SENSOR MODULE

CROSS-REFERENCE TO RELATED APPLICATIONS

This application is based upon and claims the benefit of priority from Japanese patent application No. 2015-144781, filed on Jul. 22, 2015, the disclosure of which is incorporated herein in its entirety by reference.

BACKGROUND

The present invention relates to an image sensor and a sensor module. For example, the present invention relates to an image sensor and a sensor module which have a configuration in which the image sensor and an arithmetic unit that controls the image sensor are provided separately.

In recent years, the demand for widening the dynamic range of an image obtained by an image sensor has been increasing. An HDR (High Dynamic Range) technique is known as a technique for widening the dynamic range of an image. In the HDR technique, a high-brightness side image obtained with a short exposure time and a low-brightness side image obtained with a long exposure time are synthesized to thereby widen the dynamic range of the image. Techniques related to the HDR technique are disclosed in Japanese Unexamined Patent Application Publication No. 2006-311240 and the specification of U.S. Patent Application Publication No. 2011/0285737.

In Japanese Unexamined Patent Application Publication No. 2006-311240, two image signals obtained based on different exposure times in an imaging device are simultaneously read out, and the images are synthesized by a synthesizing circuit. In this case, in the synthesizing circuit disclosed in Japanese Unexamined Patent Application Publication No. 2006-311240, when the image signal having a greater exposure of the two image signals is saturated, the image signal having a lesser exposure that is read out from a pixel adjacent to a pixel from which the image signal having the greater exposure is read out is amplified. Further, in the synthesizing circuit disclosed in Japanese Unexamined Patent Application Publication No. 2006-311240, when the signal of the pixel having the greater exposure is not saturated, the synthesizing circuit uses this signal, and when the signal of the pixel having the greater exposure is saturated, the synthesizing circuit uses the amplified signal, and synthesizes the signals of the pixels so as to produce an image signal for forming an image.

The specification of U.S. Patent Application Publication No. 2011/0285737 discloses a technique in which, when short second exposure image data obtained with a short exposure time and long second exposure image data obtained with a long exposure time are synthesized, the same format as that for an image which requires no HDR processing is used as an output image format.

SUMMARY

The use of the techniques disclosed in Japanese Unexamined Patent Application Publication No. 2006-311240 and the specification of U.S. Patent Application Publication No. 2011/0285737 makes it possible to provide an image subjected to HDR processing to a user who adopts an image sensor. However, in the image subjected to HDR processing, the settings regarding the two exposure times cannot be read, which causes a problem that the user cannot increase the image quality of an output image by adjusting the exposure times.

Other problems to be solved by and novel features of the present invention will become apparent from the following description and the accompanying drawings.

A first aspect of the present invention is an image sensor and a sensor module having a configuration in which the image sensor outputs first brightness information representing brightness information of first image information obtained with a first exposure time and second brightness information representing brightness information of second image information obtained with a second exposure time separately from a composite image obtained by synthesizing the first image information and the second image information, updates the first exposure time and the second exposure time based on an exposure time set value generated outside the image sensor based on the first brightness information and the second brightness information, and changes a synthesis set value used for synthesis of the composite image based on the exposure time set value generated outside the image sensor based on the first brightness information and the second brightness information.

According to the first aspect, it is possible for a user to adjust the image quality of the composite image based on the first brightness information and the second brightness information that are obtained from the image sensor.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

The following description and the drawings are abbreviated or simplified as appropriate for clarity of explanation. The elements illustrated in the drawings as functional blocks for performing various processes can be implemented hardwarewise by a CPU, a memory, and other circuits, and softwarewise by a program loaded into a memory. Accordingly, it is understood by those skilled in the art that these functional blocks can be implemented in various forms including, but not limited to, hardware alone, software alone, and a combination of hardware and software. Note that in the drawings, the same elements are denoted by the same reference numerals, and repeated descriptions thereof are omitted as needed.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

First Embodiment

Figure 1:
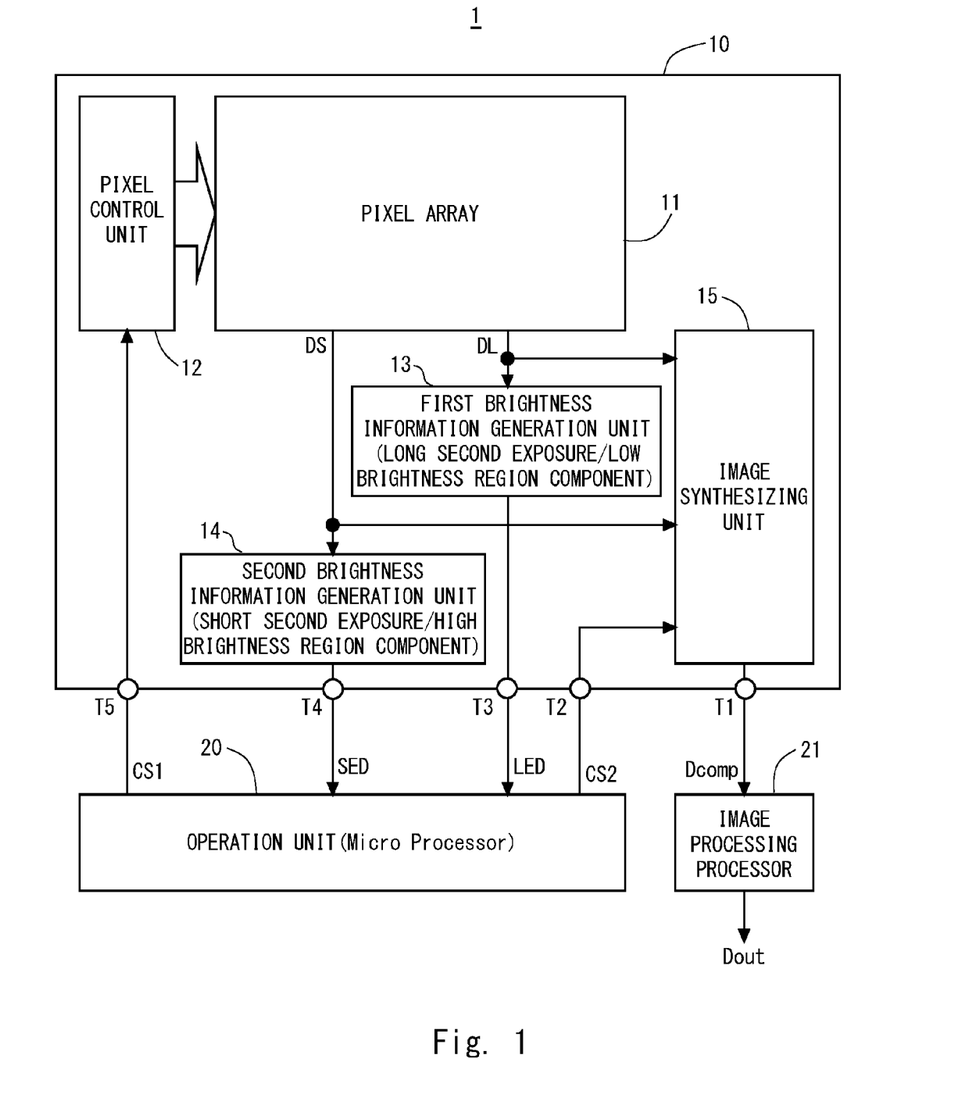
FIG. 1 is a block diagram showing a sensor module according to a first embodiment.

A sensor module 1 according to a first embodiment includes an image sensor of a camera system, an operation unit that controls the image sensor, and an image processing processor that performs image processing on image data obtained from the image sensor. FIG. 1 shows a block diagram of the sensor module 1 according to the first embodiment.

As shown in FIG. 1, the sensor module 1 according to the first embodiment includes an image sensor 10, an arithmetic unit (for example, an operation unit 20), and an image processing processor 21.

The image sensor 10 converts optical information regarding light entering via the lens of the camera system into electric information, further converts the electric information into image data, and outputs the image data. The image sensor 10 has a function for performing HDR (High Dynamic Range) processing to perform a dynamic range widening process on the obtained image. The image data output from the image sensor 10 is hereinafter referred to as a composite image Dcomp, regardless of whether the HDR processing is performed on the image data or not.

Further, in a mode in which an HDR image is generated, the image sensor 10 obtains a plurality of pieces of image data (two pieces of image data in the following description) with different exposure times, and synthesizes the two pieces of image data to thereby generate the composite image Dcomp. The image sensor 10 generates brightness information on the obtained pieces of image data for each of the two pieces of image data, and outputs the brightness information as first brightness information LED and second brightness information SED.

Further, the image sensor 10 receives, from the outside, a synthesis set value used for generating the composite image Dcmp and an exposure time set value representing the set value of the exposure time. The image sensor 10 changes the length of the exposure time according to the exposure time set value. The image sensor 10 changes the setting for the processing of synthesizing the two pieces of image data according to the synthesis set value.

To implement the above-described functions, the image sensor 10 according to the first embodiment includes a pixel array 11, a pixel control unit 12, a first brightness information generation unit 13, a second brightness information generation unit 14, and an image synthesizing unit 15. The image sensor 10 includes an analog-to-digital conversion circuit, a buffer circuit, and the like, which are not shown in FIG. 1.

The pixel array 11 outputs image information based on incident light information. In the pixel array 11, pixels that convert the optical information into the electric information are arranged in a lattice shape. The electric information obtained from the pixel array 11 is an analog voltage value at which the voltage varies depending on the amount of charge accumulated in the pixels. The image sensor 10 converts the electric information obtained from the pixel array 11 into a digital value by using the analog-to-digital conversion circuit. Further, the image sensor 10 generates the brightness information and the composite image Dcomp based on the image data composed of a pixel value represented by the digital value.

The pixel control unit 12 controls the exposure time for the pixels arranged in the pixel array 11. The pixel control unit 12 receives a control signal CS1 via an external terminal T5. The control signal CS1 includes the exposure time set value, and the pixel control unit 12 controls the exposure for the pixels for a time according to the exposure time set value. An example will be described in which when one composite image Dcomp is generated by performing the HDR processing, the pixel control unit 12 exposes the pixels to light with different exposure times to thereby generate two pieces of image information. For example, in the image sensor 10, the pixel control unit 12 exposes the pixels to light with a first exposure time and outputs first image information (for example, long second exposure image data DL) from the pixel array 11, and the pixel control unit 12 exposes the pixels to light with a second exposure time shorter than the first exposure time, and outputs second image information (for example, short second exposure image data DS) from the pixel array 11.

The first brightness information generation unit 13 generates the first brightness information LED from the first image information (for example, the long second exposure image data DL) generated based on the incident light information obtained by the pixel array 11 with the first exposure time. The second brightness information generation unit 14 generates the second brightness information SED from the second image information (for example, the short second exposure image data DS) generated based on the incident light information obtained by the pixel array 11 with the second exposure time shorter than the first exposure time. In this case, the first brightness information LED and the second brightness information SED each include at least one of a histogram of image data corresponding to the corresponding information, a brightness peak value, and an average brightness. The first brightness information LED is output via an external terminal T3, and the second brightness information SED is output via an external terminal T4.

The image synthesizing unit 15 synthesizes the first image information (for example, the long second exposure image data DL) and the second image information (for example, the short second exposure image data DS) and outputs the composite image Dcomp. The composite image Dcomp is output via an external terminal T1. In this case, the image synthesizing unit 15 receives the synthesis set value in a control signal CS2 input via an external terminal T2. The image synthesizing unit 15 changes the type of the synthesis processing by using the long second exposure image data DL and the short second exposure image data DS based on the synthesis set value. The details of the synthesis set value will be described later.

The operation unit 20 generates the exposure time set value and the synthesis set value based on long second exposure brightness data LED and short second exposure brightness data SED which are obtained from the image sensor 10. The operation unit 20 is, for example, a semiconductor device having an arithmetic function, such as a microprocessor, and calculates various set values from the obtained data. The details of a method for calculating the exposure time set value and the synthesis set value in the operation unit 20 will be described later. The calculations of the exposure time set value and the synthesis set value in the operation unit 20 may be implemented by a hardware process using, for example, a logic circuit, or may be implemented by causing an arithmetic circuit to execute a program.

The image processing processor 21 performs image processing, such as color correction or sharpness correction, on the composite image Dcomp, and outputs an output image Dout. The output image Dout is stored in a storage device (not shown). The output image Dout is displayed on a display unit mounted on the camera system.

Figure 2:
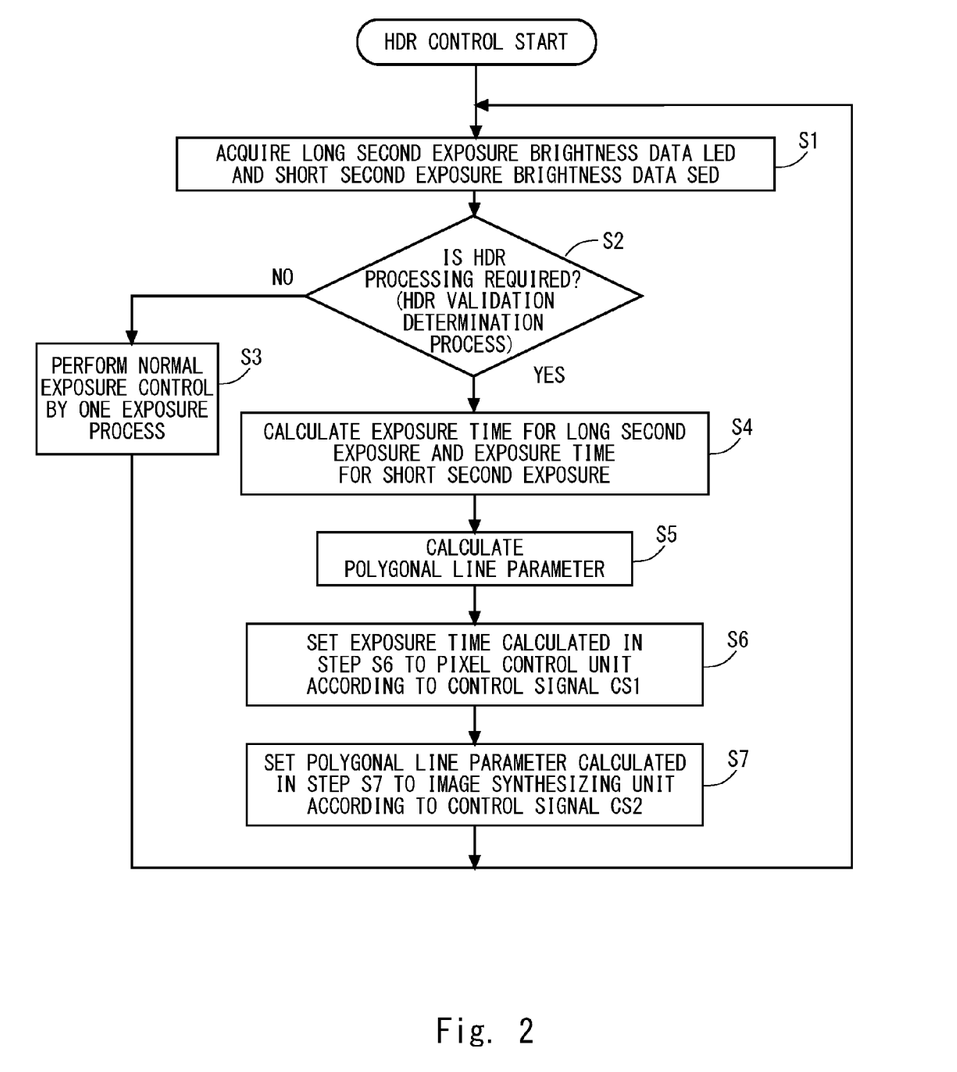
FIG. 2 is a flowchart of an HDR control in the sensor module according to the first embodiment.

Next, the operation of the sensor module 1 according to the first embodiment will be described. In the following description, the operation of the sensor module 1 when the HDR control in the operation of the sensor module 1 is performed will be mainly described. FIG. 2 shows a flowchart for explaining the operation of the sensor module 1 according to the first embodiment. The flowchart shown in FIG. 2 relates to processing in the operation unit 20. The sensor module 1 according to the first embodiment operates by reflecting the exposure time set value and the synthesis set value, which are generated by the operation unit 20 in accordance with the flowchart shown in FIG. 2, in the operation of the image sensor 10.

In the sensor module 1 according to the first embodiment, the image sensor 10 outputs the brightness information (for example, the long second exposure brightness data LED and the short second exposure brightness data SED) obtained by extracting information on the brightness of the image acquired from the obtained image data. The operation unit 20 calculates the exposure time set value and the synthesis set value by using the brightness information.

As shown in FIG. 2, the operation unit 20 first acquires, from the image sensor 10, the long second exposure brightness data LED including the brightness information of the long second exposure image data DL, and the short second exposure brightness data SED including the brightness information of the short second exposure image data DS (step S1). The brightness data acquisition process in step S1 is performed every time the image sensor 10 obtains data corresponding to one screen, or is performed once when a plurality of screens are obtained. That is, the frequency of the brightness data acquisition process can be arbitrarily changed depending on the design specifications of the sensor module 1.

In this case, the operation unit 20 generates, based on the obtained data, an average brightness value of the image during a long second exposure, a brightness peak value during a short second exposure, and a full-screen brightness histogram. The full-screen brightness histogram is a full-screen brightness histogram of one of the long second exposure image data DL, the short second exposure image data DS, and the composite image Dcomp. The full-screen histogram of the composite image Dcomp can be calculated based on the synthesis set value, the long second exposure brightness data LED, and the short second exposure brightness data SED, which are set to the image sensor 10 when the operation unit 20 starts operation, or performs the process in step S7, which is described later, in the previous process cycle.

Subsequently, the operation unit 20 performs an HDR validation determination process to determine whether it is necessary to cause the image sensor 10 to perform the HDR operation (step S2). In the HDR validation process, for example, referring to the full-screen histogram, when the ratio of a region in which the pixel value is saturated to the entire screen is equal to or larger than an assumed ratio, it is determined that the HDR operation is necessary. Also, in the DHR validation process, when the average brightness calculated from the full-screen histogram is equal to or larger than an assumed brightness value, it can be determined that the HDR operation is necessary. Note that the assumed ratio or the assumed brightness value may be set as a preset value, or may be set based on an instruction from a user. The determination as to whether the HDR operation is necessary or not is mainly performed in the process of step S2.

On the other hand, when the brightness peak value of the long second exposure brightness data LED is smaller than a maximum value of an output code value representing the brightness of a pixel, the operation unit 20 determines that the HDR operation is unnecessary. In this case, in the first embodiment, the operation unit 20 outputs, to the pixel control unit 12, the control signal CS1 to instruct the pixel control unit 12 to perform the exposure operation once, and instructs the pixel control unit 12 to perform a normal exposure control by the one exposure operation (step S3).

Subsequently, when it is determined that the HDR operation is necessary in step S2, the operation unit 20 performs the operations in steps S4 to S7. In step S4, the operation unit 20 calculates the first exposure time (for example, the exposure time for the long second exposure) and the second exposure time (for example, the exposure time for the short second exposure). In the exposure time calculation process in step S4, the exposure time for the long second exposure and the exposure time for the short second exposure are calculated by the following calculations. The length of the exposure time for the long second exposure is calculated so that the average brightness of the long second exposure brightness data LED reaches a target brightness. This target brightness may be preliminarily set, or may be set based on an external instruction. The target brightness is a screen average brightness estimated from the brightness value at which the pixel value in a region having a predetermined ratio to the screen of the short second exposure image data DS represents a value equal to or smaller than a maximum output code. The length of the exposure time for the short second exposure is set so that the brightness peak value of the short second exposure brightness data SED becomes equal to or smaller than the maximum output code that the pixel value can take.

Figure 3:
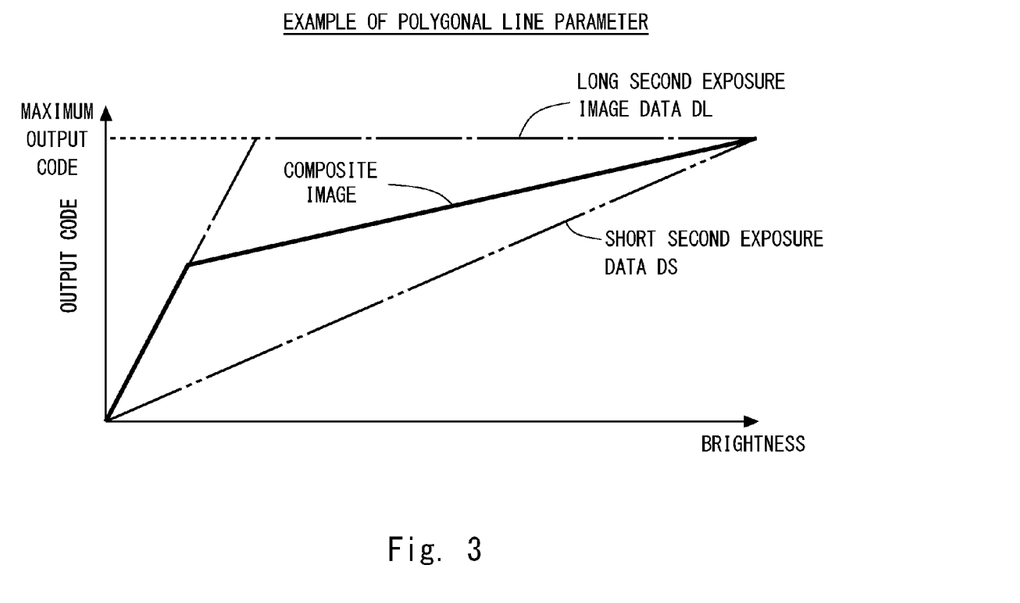
FIG. 3 shows an example of a polygonal line parameter in the sensor module in the first embodiment.

Subsequently, in step S5, the operation unit 20 calculates the synthesis set value. This synthesis set value is, for example, a polygonal line parameter. The polygonal line parameter will now be described. FIG. 3 shows an example of the polygonal line parameter in the sensor module according to the first embodiment.

As shown in FIG. 3, in the image sensor 10 according to the first embodiment, the long second exposure image data DL represents a brightness graph in which the output code reaches the maximum output code at a relatively low brightness. The short second exposure image data DS represents a brightness graph in which the maximum brightness of an object to be photographed corresponds to the maximum output code. The composite image Dcomp represents a brightness graph in which the slope of the graph becomes less steep after the brightness of the object to be photographed reaches a certain brightness. That is, in the image sensor 10 according to the first embodiment, the long second exposure image data DL and the short second exposure image data DS are obtained; the long second exposure image data DL is used as a pixel component until the output code of the composite image Dcomp reaches an output code threshold included in the synthesis set value; and the short second exposure image data DS is used as a pixel component larger than the output code threshold. The image synthesizing unit 15 synthesizes images by selectively using the long second exposure image data DL and the short second exposure image data DS based on the output code threshold, thereby obtaining a composite image in which both the contrast corresponding to a low-brightness portion and the contrast corresponding to a high-brightness portion are achieved. The synthesis set value (for example, a polygonal line parameter) includes the output code threshold and the value representing the compressibility of the short second exposure image data DS. If the maximum output code of the short second exposure image data DS is set to be smaller than the number of bits of the maximum output code of the long second exposure image data DL, the value representing the compressibility of the short second exposure image data DS can be omitted from the polygonal line parameter.

The operation unit 20 outputs the exposure time set value and the synthesis set value so that the output code of the pixel with the maximum brightness in the composite image Dcomp becomes equal to or smaller than the maximum output code corresponding to the maximum value of the brightness value of the pixel, based on the long second exposure brightness data LED and the short second exposure brightness data SED.

The operation unit 20 determines the polygonal line parameter in the following manner. The operation unit 20 compares histogram patterns included in the long second exposure brightness data LED and the short second exposure brightness data SED (each of the histogram patterns is hereinafter referred to as an imaging histogram pattern) with a plurality of histogram patterns prepared in advance (each of the histogram patterns is hereinafter referred to as a candidate histogram pattern). Further, the operation unit 20 selects, as a polygonal line parameter to be applied to the image synthesizing unit 15, a polygonal line parameter associated with the candidate histogram pattern that is most similar to the imaging histogram pattern.

Subsequently, the operation unit 20 supplies the pixel control unit 12 with the exposure time set value calculated in step S4, and updates the exposure time set value of the pixel control unit 12 (step S6). Further, the operation unit 20 supplies the image synthesizing unit 15 with the polygonal line parameter calculated in step S5, and updates the synthesis set value of the image synthesizing unit 15 (step S7). In the sensor module 1 according to the first embodiment, the processes in steps S1 to S7 are repeatedly executed to thereby maintain the image quality of the composite image Dcomp.

As described above, in the sensor module 1 according to the first embodiment, the image sensor 10 outputs the brightness information on two images used for the HDR operation. Accordingly, in the sensor module 1 according to the first embodiment, the operation unit 20 adjusts the exposure time set value and the synthesis set value by referring to the brightness information output from the image sensor 10, thereby obtaining the composite image Dcomp with a high contrast on the entire screen, without saturating the output code. That is, in the sensor module 1 according to the first embodiment, the operation unit 20 optimizes the image, which is obtained through two exposure processes and cannot be grasped from the composite image Dcomp, based on the two pieces of brightness information, thereby improving the image quality of the composite image Dcomp.

In this case, the operation unit 20 is provided separately from the image sensor 10, and can control processes for exposure settings and synthesis settings by using a circuit or a program. When the operation unit 20 is incorporated in the image sensor 10, noise in the image sensor 10 increases, which causes a problem of deterioration in the image quality. This is because, since the operation unit 20 performs a large amount of operation, the circuit size and power consumption are increased, so that a deviation occurs in the analog voltage value output from the pixel array 11 due to power supply noise or the like. That is, in the sensor module 1 according to the first embodiment, a flexible adjustment of the HDR synthesis process can be achieved while suppressing the deterioration in the image quality due to noise in the image sensor 10. Furthermore, the sensor module 1 according to the first embodiment can easily change the type of images provided as the composite image Dcomp according to a request from the user of the sensor module 1.

In the sensor module 1 according to the first embodiment, the operation unit 20 is provided separately from the image sensor 10 and the image processing processor 21. Some users may have the image processing processor 21 which has been already developed. Even in such a case, after the operation unit 20 adjusts the image quality of the composite image Dcomp output from the image sensor 10 in the sensor module 1, a combination of the image sensor 10 and the operation unit 20 can be provided to the user. This allows the user to adopt a new sensor module 1 by effectively using the already developed image processing processor 21.

Second Embodiment

Figure 4:
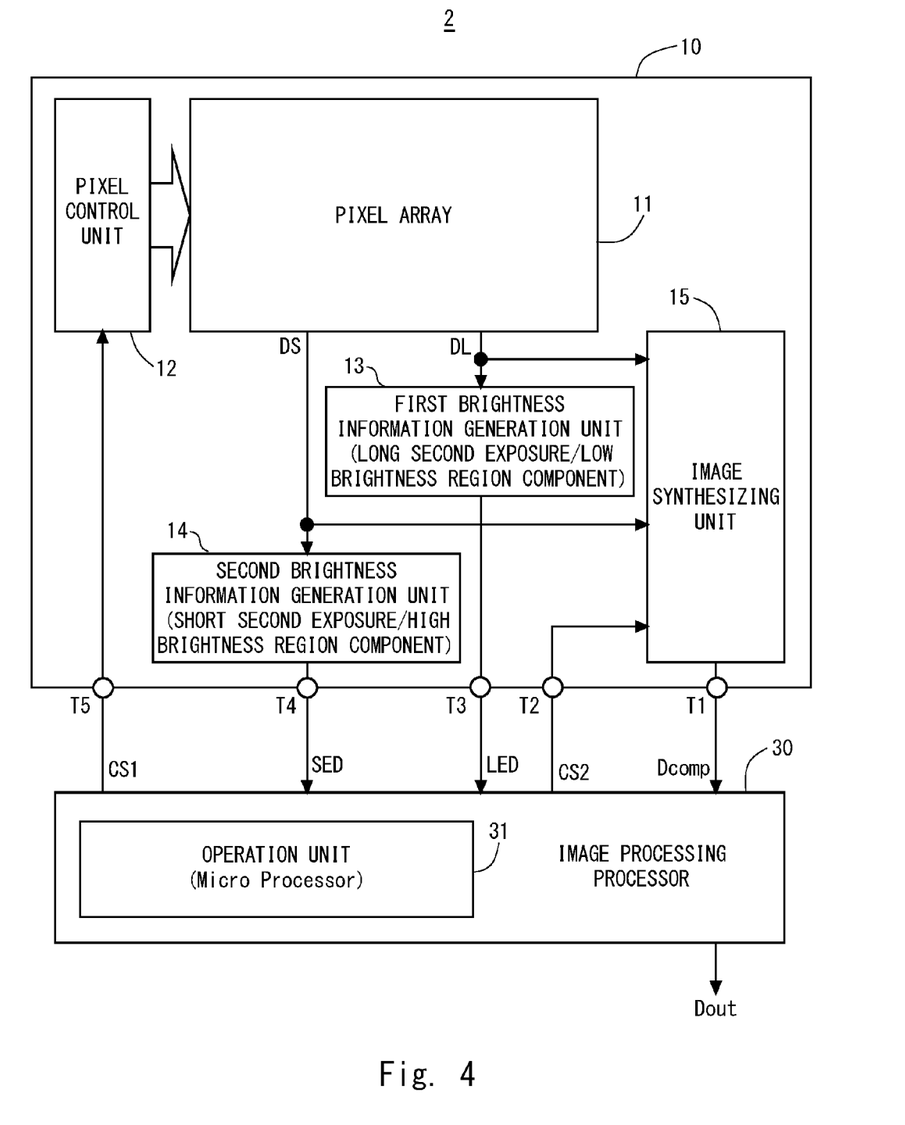
FIG. 4 is a block diagram showing a sensor module according to a second embodiment.

In a second embodiment, a sensor module 2 which is another mode of the sensor module 1 according to the first embodiment will be described. FIG. 4 shows a block diagram of the sensor module 2 according to the second embodiment. In the description of the second embodiment, the components of the second embodiment that are similar to those of the first embodiment are denoted by the same reference numerals as those in the first embodiment, and the descriptions thereof are omitted.

As shown in FIG. 4, the sensor module 2 according to the second embodiment includes an image processing processor 30 instead of the operation unit 20 and the image processing processor 21. The image processing processor 30 includes an operation unit 31. In other words, in the sensor module 2 according to the second embodiment, an arithmetic unit, such as a CPU (Central Processing Unit), which is incorporated in the image processing processor 30, is used instead of the operation unit 20.

As described above, in the sensor module 2 according to the second embodiment, the use of the operation unit 31 incorporated in the image processing processor 30 makes it possible to perform the same processing as that of the sensor module 1 according to the first embodiment. Accordingly, even when the image processing processor 30 is already set, the user can adopt the image sensor 10 having the HDR function by causing the image processing processor 30 to perform the same operation as that of the operation unit 20.

Third Embodiment

Figure 5:
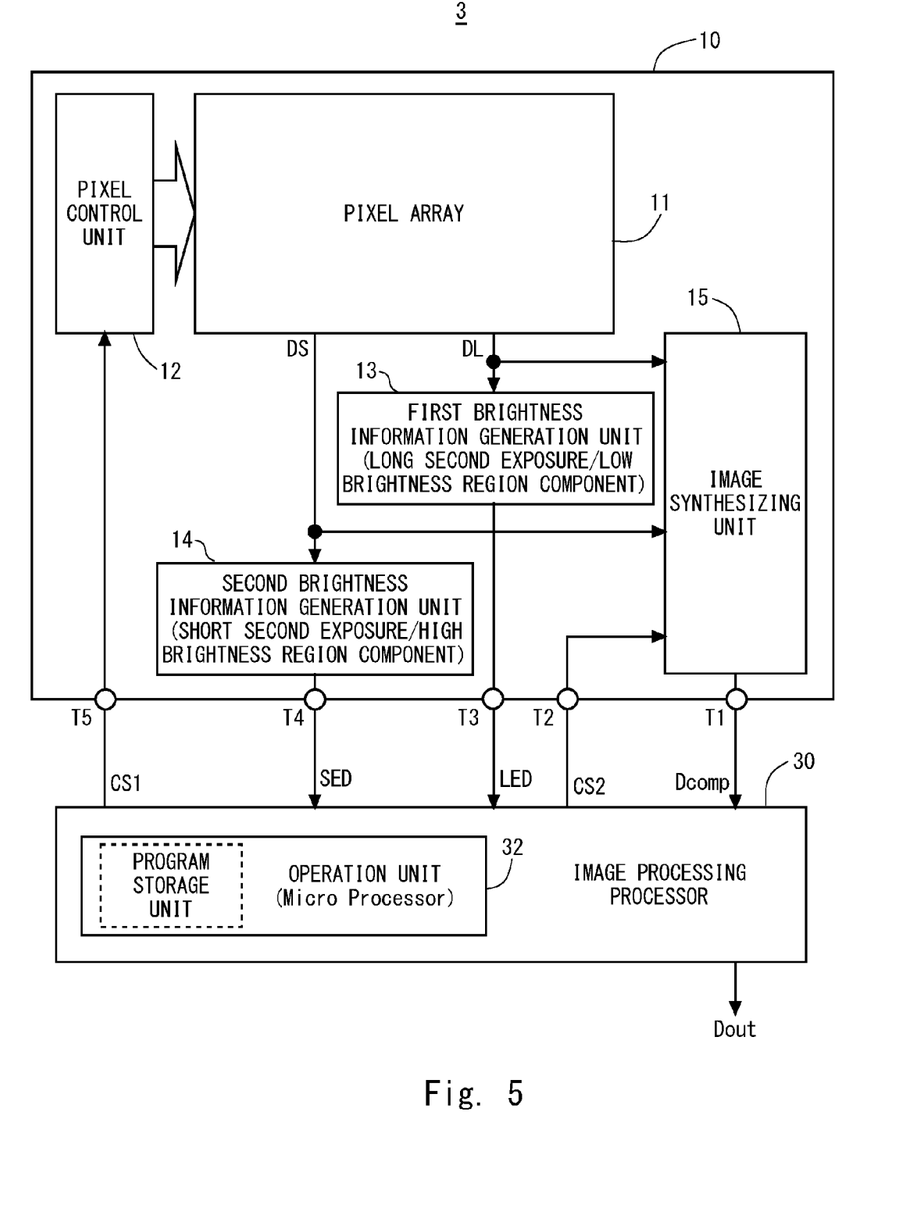
FIG. 5 is a block diagram showing a sensor module according to a third embodiment.

In a third embodiment, another mode of the sensor module 2 according to the second embodiment will be described. FIG. 5 shows a block diagram of a sensor module 3 according to the third embodiment. In the description of the third embodiment, the components of the third embodiment that are similar to those of the first and second embodiments are denoted by the same reference numerals as those in the first embodiment, and the descriptions thereof are omitted.

As shown in FIG. 5, the sensor module 3 according to the third embodiment includes an operation unit 32 instead of the operation unit 31. The operation unit 32 includes a program storage unit. The program storage unit stores an OS (Operating System), a device driver, middleware, a user interface application, and the like as software. The software stored in the program storage unit can be added or deleted. For example, the HDR function described in the first and second embodiments is provided as middleware.

Figure 6:
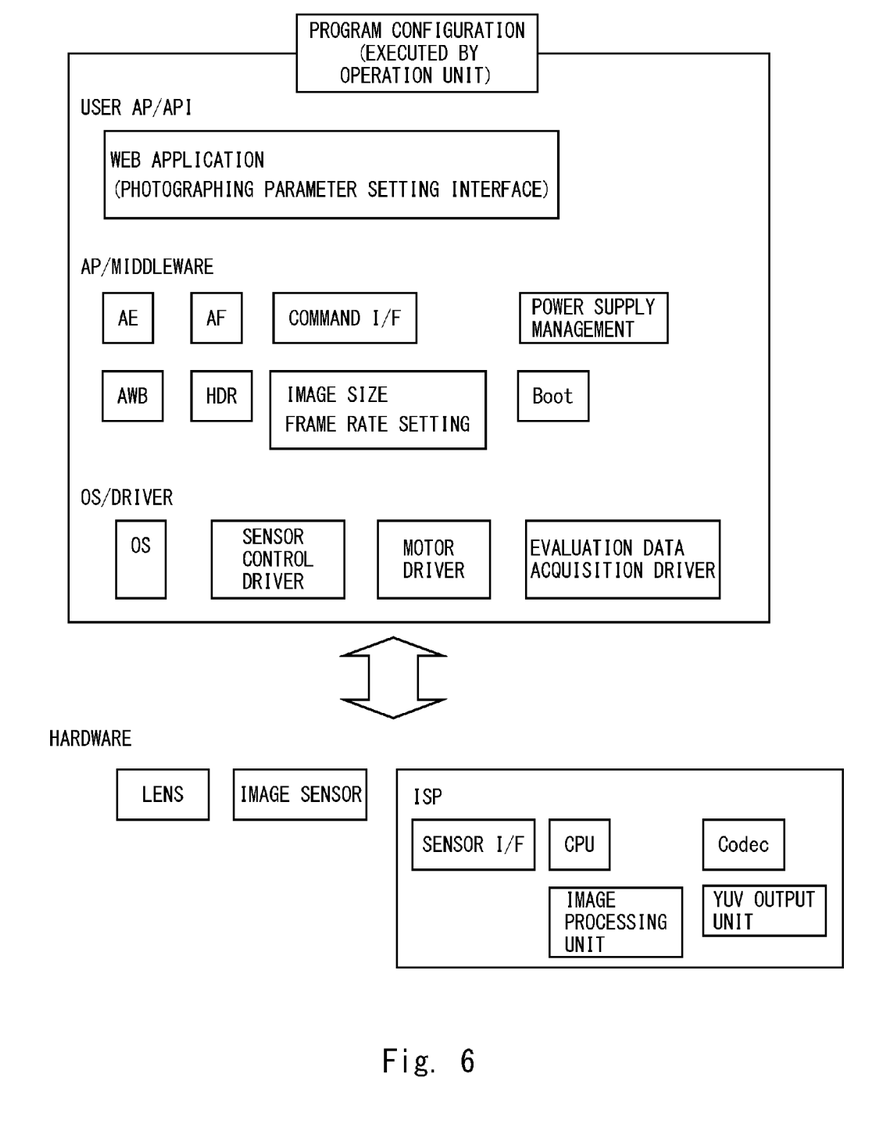
FIG. 6 is a diagram for explaining a configuration of a program in the sensor module according to the third embodiment.

The configuration of the program stored in the program storage unit will now be described. FIG. 6 shows a diagram for explaining the configuration of the program in the sensor module according to the third embodiment. As shown in FIG. 6, in an example of the configuration of the program stored in the program storage unit, an OS, a sensor control driver, a motor driver, an evaluation data acquisition driver, and the like are mounted as OS/driver layer software. The OS is basic software to cause software, such as a driver and middleware, to run. The sensor control driver is software for performing basic control of the image sensor 10. The motor driver is software for controlling a motor that drives, for example, the lens of the camera system on which the sensor module 3 is mounted. The evaluation data acquisition driver is software to receive brightness information from the image sensor 10 and evaluate the image quality.

Examples of the AP/middleware layer software include automatic exposure control (AE) software, auto-focus control (AF) software, command interface software, power supply management software, automatic white balance control (AWB) software, HDR control software, image size/frame rate setting software, and boot control software. The automatic exposure control software is software to control an aperture within an optical mechanism of the camera system on which the sensor module 3 is mounted. The auto-focus control software is control software for adjusting the focus on a subject by moving the lens of the camera system on which the sensor module 3 is mounted. The command interface software is software to mediate commands received and transmitted between pieces of software. The power supply management software is software for managing the power supply of the camera system. The automatic white balance control software is software for controlling the image processing processor 30 to adjust the white balance of the output image Dout. The HDR control software is software for performing operations on the exposure time set value and the synthesis set value which are described in the first embodiment. The image size/frame rate setting software is software for controlling the image size of the composite image Dcom and the frame rate of the image sensor 10. The boot software is software to perform start-up processing for the camera system.

Examples of user AP/API layer software include Web application software to provide a user interface.

With the software configuration as shown in FIG. 6, the driver, middleware, and user software can be added or deleted, and the functions of the software can be updated.

To update the functions of the software, for example, a function for dealing with backlight may be added to the HDR control software so that the image quality can be enhanced in a backlight condition. In the backlight condition, a low-brightness region included in the short second exposure image data DS and a low-brightness region included in the long second exposure image data DL have a small area, and thus the time difference between the long second exposure time and the short second exposure time is small. In this state, in order to increase the contrast in the low-brightness region, a correction can be made to forcibly increase the long second exposure time. However, the maximum length of the long second exposure time is limited due to the limitation of the frame rate. Accordingly, in the function for dealing with backlight, which is added in the third embodiment, the amplification factor for the long second exposure image data DL used for the low-brightness region is changed by adjusting the output code threshold in the polygonal line parameter. Thus, in the function for dealing with backlight, which is added in the third embodiment, the image quality can be enhanced in the backlight condition.

In the sensor module 3 according to the third embodiment, as a function corresponding to the function for dealing with backlight, a scene determination function may be added as middleware. In the scene determination function, the backlight condition is determined based on the brightness information of the composite image Dcomp. The addition of the scene determination function makes it possible to enhance the image quality in the backlight condition by detecting the backlight condition and activating the function for dealing with backlight as the HDR function, even when the image processing processor 30 is not provided with the scene determination function. Since the image sensor 10 according to the third embodiment has the function for outputting the long second exposure brightness data LED and the short second exposure brightness data SED, if the scene determination function is implemented using the long second exposure brightness data LED and the short second exposure brightness data SED, the scene determination function can be implemented by incorporating it into the HDR function.

As described above, in the sensor module 3 according to the third embodiment, the operation unit 32 includes the program storage unit, and the functions of the sensor module 3 can be changed by adding or deleting programs stored in the program storage unit.

Further, since it is possible to add or delete programs later, the user who uses the sensor module 3 according to the third embodiment can be provided, from a supplier of the image sensor 10, with functions including the knowledge and techniques that are not owned by the user.

Fourth Embodiment

In a fourth embodiment, examples of functions which can be added as software will be described. In the fourth embodiment, a flicker removal function will be described. A light source, such as a fluorescent lamp, which lights up based on a commercial power supply, blinks at a cycle corresponding to the frequency of the commercial power supply. The flicker phenomenon is a phenomenon in which horizontal stripes occur in the screen when the photographing frame rate is synchronized with the blink cycle of the light source.

Figure 7:
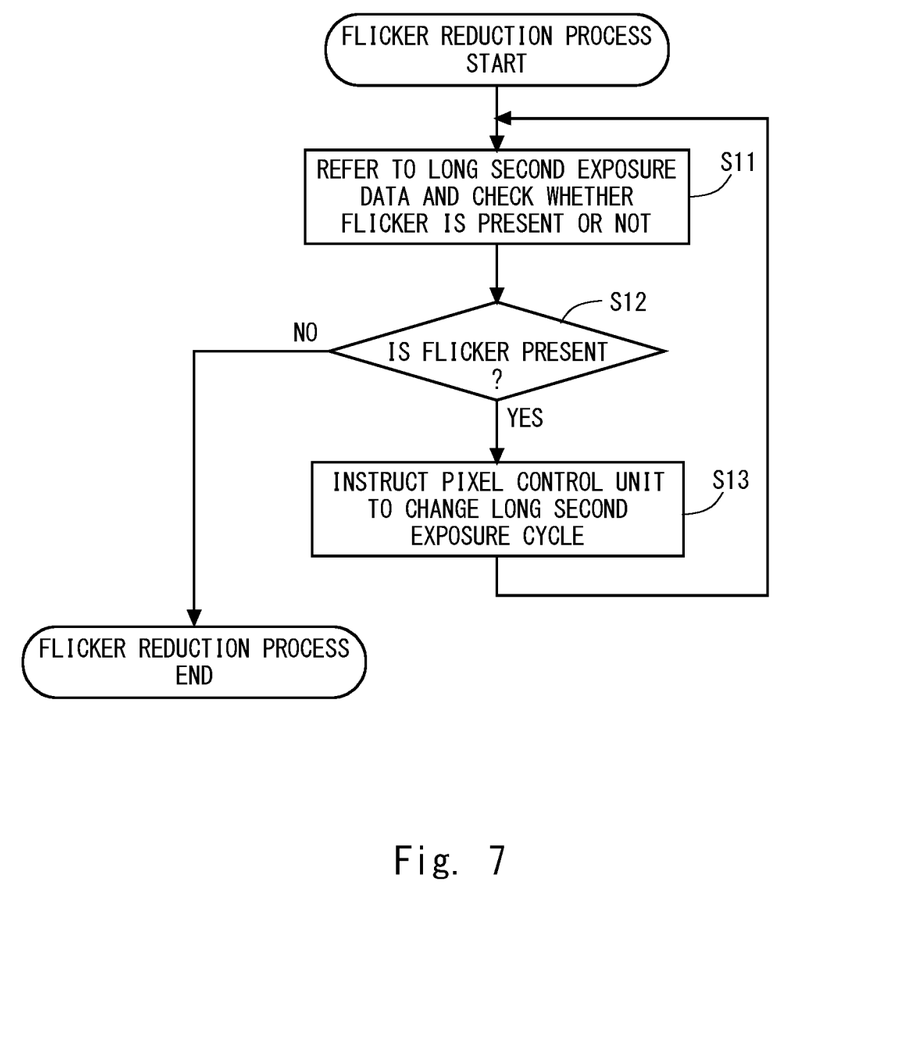
FIG. 7 is a flowchart showing a flicker reduction process in a sensor module according to a fourth embodiment.

The flicker removal function according to the fourth embodiment is added to the program storage unit as middleware. FIG. 7 is a flowchart showing the operation of the flicker removal function. The example shown in FIG. 7 illustrates the operation of the flicker removal function when the sensor module 1 according to the first embodiment is used.

As shown in FIG. 7, in the flicker removal function according to the fourth embodiment, the operation unit 20 checks whether a flicker is present or not by referring to the long second exposure brightness data LED (step S11). Subsequently, the operation unit 20 determines whether a flicker is present or not based on the result of step S11 (step S12). When it is determined that a flicker is present, the operation unit 20 instructs the pixel control unit 12 to change the cycle of the long second exposure (step S13). Specifically, when an occurrence of a flicker in the short second exposure image data DS is detected based on the long second exposure brightness data LED, the sensor module 1 to which the flicker removal function according to the fourth embodiment is added changes the cycle of performing the exposure in the first exposure time.

For example, when scenes both inside a room and outside the room where it is bright are photographed from inside the room, the image of the scene inside the room is captured based on lighting using the commercial power supply, while the image of the scene outside the room is captured based on the sunlight. In this case, since the intensity of outdoor light is higher than that of indoor light, the average brightness of the composite image Dcom is set to a high level because of the sunlight, which makes it difficult to detect a flicker in the image of the scene inside the room based on the composite image. Accordingly, in the flicker removal function according to the fourth embodiment, a flicker is detected using the average brightness of the long second exposure image data DL. Thus, in the flicker removal function according to the fourth embodiment, the detection of a flicker in the image of the scene inside the room can be prevented from being hindered by the sunlight.

For example, in a drive recorder mounted on a vehicle, a flicker due to lighting in a tunnel may occur when the vehicle travels through the tunnel. In such a case, a flicker removal process based on the composite image Dcomp causes a problem that a flicker occurs in a captured image of a portion of the vehicle in which no flicker is present. However, in the flicker removal function according to the fourth embodiment, the flicker removal process is performed based only on the long second exposure brightness data LED corresponding to the long second exposure image data DL. In the long second exposure brightness data LED, the light based on lighting in the tunnel is saturated. Accordingly, the use of the flicker removal function according to the fourth embodiment can solve the problem that a flicker occurs in a captured image of a portion of the vehicle.

Fifth Embodiment

Figure 8:
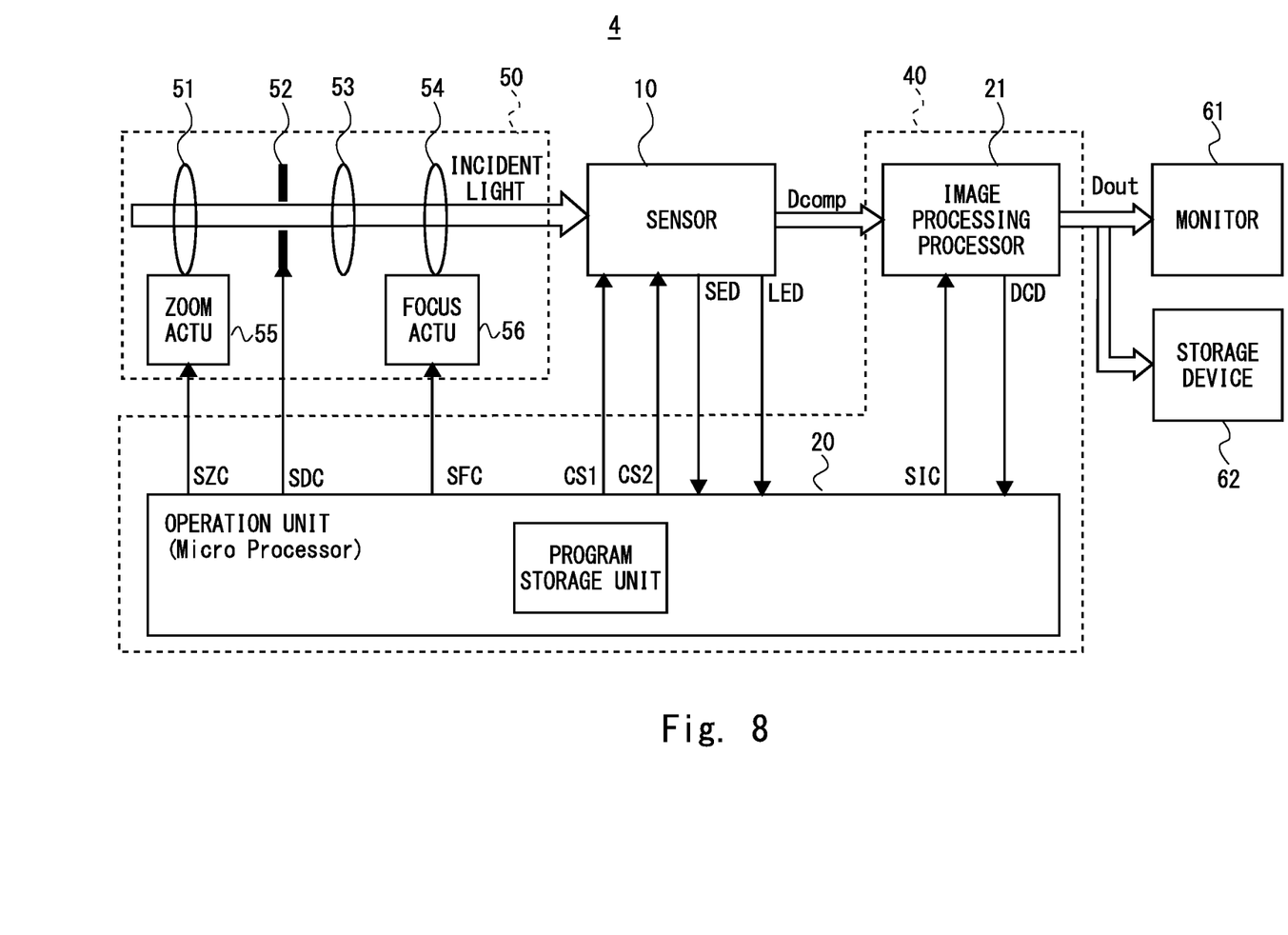
FIG. 8 is a block diagram showing a camera system according to a fifth embodiment.

In a fifth embodiment, a camera system 4 including the sensor module 1 according to the first embodiment will be described. FIG. 8 shows a block diagram of the camera system 4 according to the fifth embodiment. In the description of the fifth embodiment, the components of the fifth embodiment that are similar to those of the above embodiments are denoted by the same reference numerals, and the descriptions thereof are omitted.

The camera system 4 shown in FIG. 8 includes the sensor module 1 according to the first embodiment. In the example shown in FIG. 8, the image sensor 10, the operation unit 20, and the image processing processor 21 correspond to the sensor module 1. In the fifth embodiment, the operation unit 20 includes a program storage unit that stores software such as an OS and a driver. Further, in the fifth embodiment, the operation unit 20 has a function for controlling various lenses. In the example shown in FIG. 8, an image sensor control unit 40 is composed of the operation unit 20 and the image processing processor 21. The camera system 4 according to the fifth embodiment has a configuration in which an optical system mechanism 50, a monitor 61, and a storage device 62 are added to the sensor module 1. In the camera system 4 according to the fifth embodiment, the image sensor control unit 40 controls the image sensor 10 and the optical system mechanism 50.

In the camera system 4 according to the fifth embodiment, the composite image Dcomp is generated by the optical system mechanism 50 and the image sensor 10, and the composite image Dcomp may be a moving image. In the camera system 4 according to the fifth embodiment, the image processing processor 21 acquires the composite image Dcomp captured by the image sensor 10 and the optical system mechanism 50, and the image processing processor 21 performs image processing on the composite image Dcomp and outputs the output image Dout. Further, in the camera system 4 according to the fifth embodiment, the output image Dout is displayed on the monitor 61 and stored in the storage device 62. The camera system 4 according to the fifth embodiment has a feature that the operation unit 20 performs specific processing such as auto-focus processing and automatic exposure control, while the image processing processor 21 does not perform specific processing such as auto-focus processing and automatic exposure control. In other words, in the camera system 4 according to the fifth embodiment, control programs for auto-focus processing and automatic exposure control are not installed in the image processing processor 21. The camera system 4 according to the fifth embodiment can also be configured to perform only one of auto-focus processing and automatic exposure control as processing in the operation unit 20. The specific configuration and operation of the camera system 4 according to the fifth embodiment will be described in detail below.

The optical system mechanism 50 includes a zoom lens 51, an aperture mechanism 52, a fixed lens 53, a focus lens 54, a zoom actuator 55, and a focus actuator 56. The optical system mechanism 50 changes the focus by moving the lens by various actuators, and changes the amount of incident light by causing the aperture mechanism 12 to operate.

The zoom actuator 55 moves the zoom lens 51 to change the zoom factor. The zoom actuator 55 moves the zoom lens 51 based on a zoom control signal SZC output from the operation unit 20. The focus actuator 56 moves the focus lens 54 to change the focus of the image captured by the image sensor 10. The focus actuator 56 moves the focus lens 54 based on a focus control signal SFC output from the operation unit 20. The aperture mechanism 52 adjusts the amount of incident light reaching the image sensor 10 via a lens group. The aperture mechanism 52 adjusts the aperture amount according to an aperture control signal SDC output from the operation unit 20.

In this case, in the camera system 4 according to the fifth embodiment, the operation unit 20 performs auto-focus control, automatic exposure control, and zoom control, in addition to the HDR control described in the first embodiment. The auto-focus control and the automatic exposure control are performed based on the long second exposure brightness data LED, the short second exposure brightness data SED, and resolution information (not shown) on the composite image Dcomp, which are output from the image sensor 10. Upon receiving a zoom instruction from the outside, the operation unit 20 performs the zoom control.

Further, the image processing processor 21 performs image processing, such as image correction, on the composite image Dcomp received from the image sensor 10, and outputs the output image Dout. The image processing processor 21 analyzes received image information Do and outputs color space information DCD. The color space information DCD includes, for example, brightness information and color information of the image information Do. The operation unit 20 generates a color space control signal SIC based on the difference between the color space information DCD obtained from the image processing processor 21 and the information supplied from the user. Further, the operation unit 20 outputs the color space control signal SIC to adjust the brightness or color of the output image Dout based on the instruction from the user.

Furthermore, the operation unit 20 controls the overall operation of the camera system, such as start-up processing, termination processing, change of the type of images to be obtained, and change of the zoom factor for the camera system 4.

As described above, the camera system 4 according to the fifth embodiment using the sensor module 1 according to the first embodiment allows the user to obtain the high-quality composite image Dcom, merely by employing the HDR functions mounted on the image sensor 10 and the operation unit 20, even if the user has no knowledge about the HDR processing.

The first to fifth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An image sensor comprising:
a pixel array that outputs image information based on incident light information;
a pixel control unit that controls an exposure time for pixels arranged in the pixel array;
a first brightness information generation unit that generates first brightness information from first image information generated based on incident light information obtained by the pixel array with a first exposure time;
a second brightness information generation unit that generates second brightness information from second image information generated based on incident light information obtained by the pixel array with a second exposure time shorter than the first exposure time; and
an image synthesizing unit that synthesizes the first image information and the second image information and outputs a composite image, wherein
the pixel control unit updates the first exposure time and the second exposure time based on an exposure time set value generated by a processing device different from the pixel control circuit and the image synthesizing unit, the exposure time set value being generated by the processing device based on the first brightness information and the second brightness information, and
the image synthesizing unit updates conditions for synthesizing the first image information and the second image information based on a synthesis set value generated by the processing device based on the first brightness information and the second brightness information.

2. The image sensor according to claim 1, wherein
the first brightness information includes at least a histogram of the first image information, and
the second brightness information includes at least a histogram of the second image information.

3. The image sensor according to claim 1, wherein the image synthesizing unit performs image synthesizing processing to generate a pixel corresponding to a low brightness portion of the composite image by using the first image information equal to or smaller than an output code threshold included in the synthesis set value, and to generate a pixel corresponding to a high brightness portion of the composite image by using the second image information greater than the output code included in the synthesis set value.

4. A sensor module comprising:
an image sensor; and
an arithmetic unit that is provided separately from the image sensor, and generates an exposure time set value and a synthesis set value based on first brightness information and second brightness information, the first brightness information and the second brightness information being output from the image sensor, wherein
the image sensor includes:
a pixel array that outputs image information based on incident light information;
a pixel control unit that controls an exposure time for pixels arranged in the pixel array;
a first brightness information generation unit that generates the first brightness information from first image information generated based on incident light information obtained by the pixel array with a first exposure time;
a second brightness information generation unit that generates the second brightness information from second image information generated based on incident light information obtained by the pixel array with a second exposure time shorter than the first exposure time; and
an image synthesizing unit that synthesizes the first image information and the second image information and outputs a composite image,
the pixel control unit updates the first exposure time and the second exposure time based on the exposure time set value generated in the arithmetic unit based on the first brightness information and the second brightness information, and
the image synthesizing unit updates conditions for synthesizing the first image information and the second image information based on the synthesis set value generated in the arithmetic unit based on the first brightness information and the second brightness information.

5. The sensor module according to claim 4, wherein the arithmetic unit outputs the exposure time set value and the synthesis set value so that an output code of a pixel with a maximum brightness in the composite image becomes equal to or smaller than a maximum output code corresponding to a maximum value of a brightness value of the pixel, based on the first brightness information and the second brightness information.

6. The sensor module according to claim 4, wherein the arithmetic unit is incorporated in an image processing processor that performs image processing on the composite image.

7. The sensor module according to claim 4, wherein when an occurrence of a flicker in the first image information is detected based on the first brightness information, the arithmetic unit changes a cycle of performing an exposure in the first exposure time.

8. The sensor module according to claim 4, wherein
the arithmetic unit includes a program storage unit, and
the sensor module implements a function for outputting the exposure time set value and the synthesis set value by firmware or driver software, the firmware or driver software being added to software stored in the program storage unit.

\* \* \* \* \*